US012681472B2

(12) United States Patent
Park et al.

(10) Patent No.: US 12,681,472 B2
(45) Date of Patent: Jul. 14, 2026

(54) DETECTING A QUALITY-RELATED FAULTY COMPONENT AND PREDICTING UNCORRECTABLE ERRORS INCURRED BY A COMPONENT USING MACHINE LEARNING

(71) Applicant: Microsoft Technology Licensing, LLC, Redmond, WA (US)

(72) Inventors: Chin Hwan Park, Bellevue, WA (US); Adam Jeffery Grenzebach, Boise, ID (US); Juan Arturo Herrera Ortiz, Seattle, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 481 days.

(21) Appl. No.: 18/446,872

(22) Filed: Aug. 9, 2023

(65) Prior Publication Data

US 2025/0053166 A1    Feb. 13, 2025

(51) Int. Cl.
*G05B 23/02*          (2006.01)
(52) U.S. Cl.
CPC ................................. *G05B 23/0283* (2013.01)
(58) Field of Classification Search
CPC .... G05B 19/41875; G05B 2219/45031; G05B 2219/31357; G05B 2219/32194; G05B 2219/32201; G05B 19/418; G05B 2219/32212; G05B 2219/32221; G05B 2219/32222; G05B 2219/32368; G06F 11/079; G06F 11/0793; G06F 11/3447; G06F 11/008; G01R 31/2831; G01R 31/31703; G01R 31/318307
See application file for complete search history.

(56) References Cited

U.S. PATENT DOCUMENTS

| | | | | |
|---|---|---|---|---|
| 5,475,695 A * | 12/1995 | Caywood | ......... | G01R 31/31903 |
| | | | | 700/121 |
| 5,991,699 A * | 11/1999 | Kulkarni | ................. | H10P 74/23 |
| | | | | 700/121 |
| 6,763,130 B1 * | 7/2004 | Somekh | ........... | G05B 19/41875 |
| | | | | 700/110 |
| 7,962,472 B2 * | 6/2011 | Erickson | ............... | G06F 11/079 |
| | | | | 707/751 |

(Continued)

OTHER PUBLICATIONS

Giurgiu, et al., "Predicting DRAM reliability in the field with machine learning", Middleware '17: Proceedings of the 18th ACM/IFIP/USENIX Middleware Conference: Industrial Track, Dec. 11, 2017, pp. 15-21.

(Continued)

*Primary Examiner* — Darrin D Dunn
(74) *Attorney, Agent, or Firm* — Barta Jones, PLLC

(57) ABSTRACT

Aspects of the disclosure identify a pattern of features associated with a computing component indicating an increased probability that the component incurs an uncorrectable error. Historical component data, component features, server data, and server services are utilized to identify the patterns that correlate to an increased probability that the component incurs an uncorrectable error. For example, this data is used as input into a machine learning platform. Proactive and/or mitigating actions that reduce the probability of an uncorrectable error or its negative effects are presented and/or implemented to minimize or eliminate disruption in cloud computing services.

20 Claims, 5 Drawing Sheets

(56) References Cited

U.S. PATENT DOCUMENTS

| | | | | |
|---|---|---|---|---|
| 10,810,076 B1 * | 10/2020 | Spiro | ..................... | G06F 3/04842 |
| 10,996,270 B1 * | 5/2021 | Chillarige | .......... | G01R 31/3177 |
| 2004/0122859 A1 * | 6/2004 | Gavra | ..................... | G06F 16/00 |
| 2008/0250361 A1 * | 10/2008 | Bae | ........................... | G03F 1/72 |
| | | | | 716/132 |
| 2016/0109879 A1 * | 4/2016 | Dunlop | .................. | G01B 21/30 |
| | | | | 702/81 |
| 2017/0345015 A1 * | 11/2017 | Ranganna | ............. | H04L 43/091 |
| 2018/0238958 A1 * | 8/2018 | Song | ................. | G01R 31/2894 |
| 2020/0111015 A1 * | 4/2020 | Liu | .......................... | G06N 7/01 |
| 2020/0226742 A1 * | 7/2020 | Sawlani | ............... | G06T 7/0004 |
| 2021/0084103 A1 * | 3/2021 | Smith | ................... | G06F 9/5088 |
| 2021/0215753 A1 * | 7/2021 | Price | .................. | G01R 31/2831 |
| 2021/0364999 A1 * | 11/2021 | Lan | ...................... | G05B 19/406 |
| 2022/0050733 A1 * | 2/2022 | Selvaraju | .............. | G06N 20/00 |
| 2022/0091915 A1 * | 3/2022 | Perneti | .................. | G06F 3/0653 |
| 2023/0161655 A1 | 5/2023 | Schlichting | | |
| 2024/0168466 A1 * | 5/2024 | Shao | ............... | G05B 19/41835 |

OTHER PUBLICATIONS

International Search Report and Written Opinion received for PCT Application No. PCT/US2024/038433, Oct. 21, 2024, 18 pages.

Zhang, et al., "Predicting DRAM-Caused Node Unavailability in Hyper-Scale Clouds", 52nd Annual IEEE/IFIP International Conference on Dependable Systems and Networks (DSN), Jun. 30, 2022, pp. 275-286.

Boixaderas, et al., "Cost-Aware Prediction of Uncorrected DRAM Errors in the Field", In Proceedings of International Conference for High Performance Computing, Networking, Storage and Analysis, Nov. 9, 2020, pp. 1-15.

Schroeder, et al., "DRAM Errors in the Wild: A Large-Scale Field Study", In Journal of ACM SIGMETRICS Performance Evaluation Review, vol. 37, Issue 1, Jun. 15, 2009, pp. 1-12.

International Preliminary Report on Patentability (Chapter I) received for PCT Application No. PCT/US2024/038433, mailed on Feb. 19, 2026, 12 pages.

* cited by examiner

100

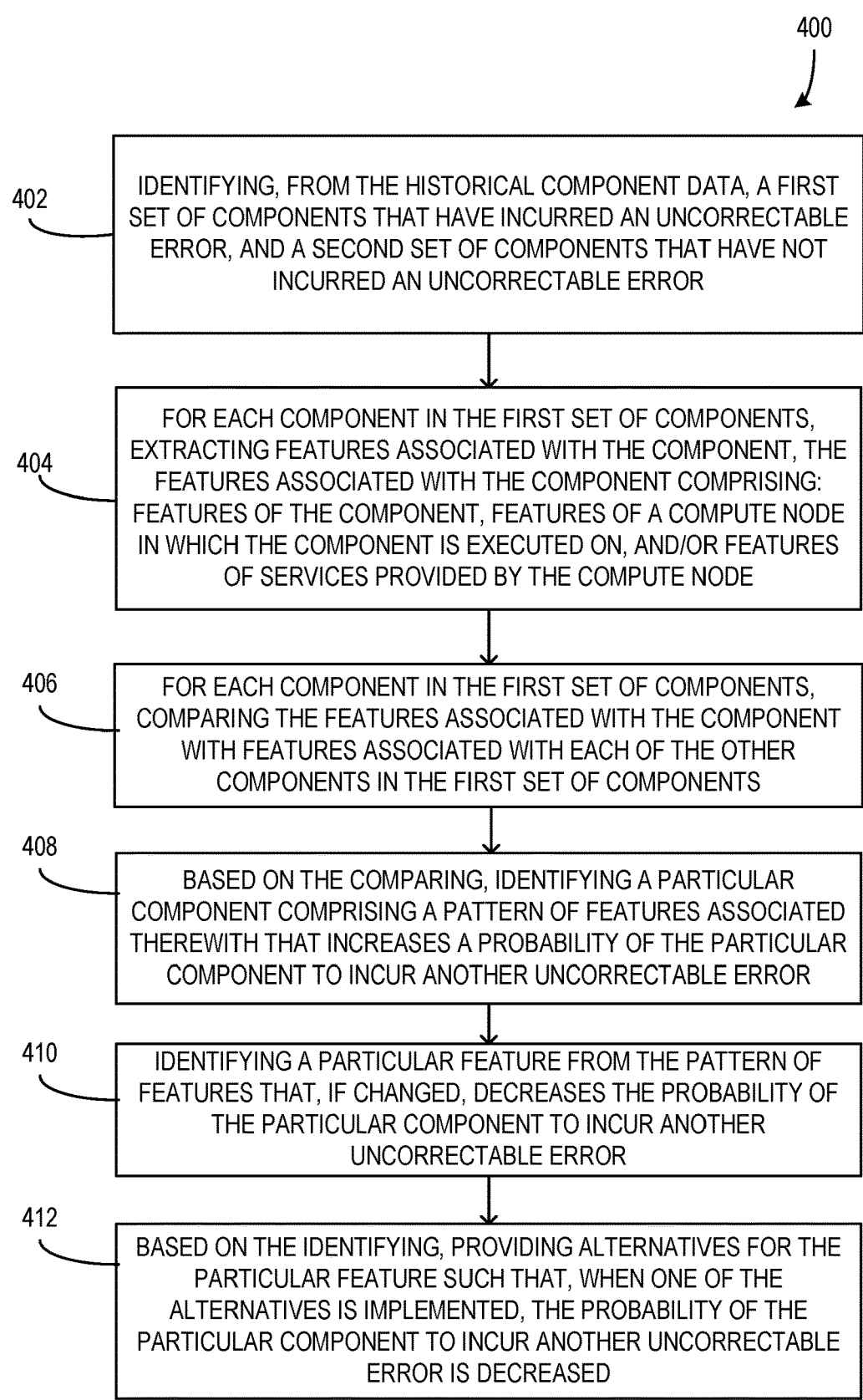

400

402 — IDENTIFYING, FROM THE HISTORICAL COMPONENT DATA, A FIRST SET OF COMPONENTS THAT HAVE INCURRED AN UNCORRECTABLE ERROR, AND A SECOND SET OF COMPONENTS THAT HAVE NOT INCURRED AN UNCORRECTABLE ERROR

404 — FOR EACH COMPONENT IN THE FIRST SET OF COMPONENTS, EXTRACTING FEATURES ASSOCIATED WITH THE COMPONENT, THE FEATURES ASSOCIATED WITH THE COMPONENT COMPRISING: FEATURES OF THE COMPONENT, FEATURES OF A COMPUTE NODE IN WHICH THE COMPONENT IS EXECUTED ON, AND/OR FEATURES OF SERVICES PROVIDED BY THE COMPUTE NODE

406 — FOR EACH COMPONENT IN THE FIRST SET OF COMPONENTS, COMPARING THE FEATURES ASSOCIATED WITH THE COMPONENT WITH FEATURES ASSOCIATED WITH EACH OF THE OTHER COMPONENTS IN THE FIRST SET OF COMPONENTS

408 — BASED ON THE COMPARING, IDENTIFYING A PARTICULAR COMPONENT COMPRISING A PATTERN OF FEATURES ASSOCIATED THEREWITH THAT INCREASES A PROBABILITY OF THE PARTICULAR COMPONENT TO INCUR ANOTHER UNCORRECTABLE ERROR

410 — IDENTIFYING A PARTICULAR FEATURE FROM THE PATTERN OF FEATURES THAT, IF CHANGED, DECREASES THE PROBABILITY OF THE PARTICULAR COMPONENT TO INCUR ANOTHER UNCORRECTABLE ERROR

412 — BASED ON THE IDENTIFYING, PROVIDING ALTERNATIVES FOR THE PARTICULAR FEATURE SUCH THAT, WHEN ONE OF THE ALTERNATIVES IS IMPLEMENTED, THE PROBABILITY OF THE PARTICULAR COMPONENT TO INCUR ANOTHER UNCORRECTABLE ERROR IS DECREASED

FIG. 4

DETECTING A QUALITY-RELATED FAULTY COMPONENT AND PREDICTING UNCORRECTABLE ERRORS INCURRED BY A COMPONENT USING MACHINE LEARNING

BACKGROUND

Cloud service providers operate millions of servers in worldwide data centers. These data centers play a pivotal role in supporting the digital infrastructure of modern society and enabling the services and applications we rely on every day. Most of these servers include certain components, in which a quality issue with one of those components will have tremendous business impacts to cloud service providers' data center operations and the services provided thereon. When a server in a data center is compromised based on a component failure, there can be significant consequences for customers depending on the severity of the failure, such as data loss, service disruption, and downtime.

Under current failure analysis between cloud service providers and component suppliers, unless component suppliers provide failure notification with preliminary failure analysis to their customers, cloud service providers are not able to perform any fast risk assessment, isolation, or mitigation actions to minimize business impact due to component quality issues. Thus, under the current component failure analysis, it is required to have actual failed components for the component supplier to diagnose symptoms of the failure using various test equipment. However, this failure analysis process takes months as the failed component has to be shipped back to the component supplier for analysis. Thus, not only is the current failure analysis of a component a slow process, the failure analysis is reactive in that it requires a component to fail.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Example solutions for predicting a failure of a component based pattern analysis include: identifying, from a plurality of components, a first set of components that have incurred an uncorrectable error and a second set of components that have not incurred an uncorrectable error: for each component in the first set of components: extracting features associated with the component, the features associated with the component comprising: features of the component, features of a compute node in which the component is executed on, and features of services provided by the compute node; and comparing the features associated with the component with features associated with each of the other components in the first set of components: based on the comparing, identifying a particular component comprising a pattern of features associated therewith that increases a probability of the particular component to incur another uncorrectable error: using causal inference, identify a particular feature from the pattern of features that, if changed, decreases the probability of the particular component to incur another uncorrectable error: based on the identifying, providing alternatives for the particular feature; and implementing one of the alternatives.

BRIEF DESCRIPTION OF THE DRAWINGS

The present description will be better understood from the following detailed description read considering the accompanying drawings, wherein:

FIG. 4 is a flowchart illustrating an example method of identifying patterns of features associated with a component that increase a probability that the component incurs an error.

Corresponding reference characters indicate corresponding parts throughout the drawings. In FIGS. 1 to 5, the systems are illustrated as schematic drawings. The drawings may not be to scale. Any of the figures may be combined into a single example or embodiment.

DETAILED DESCRIPTION

Figure 1:
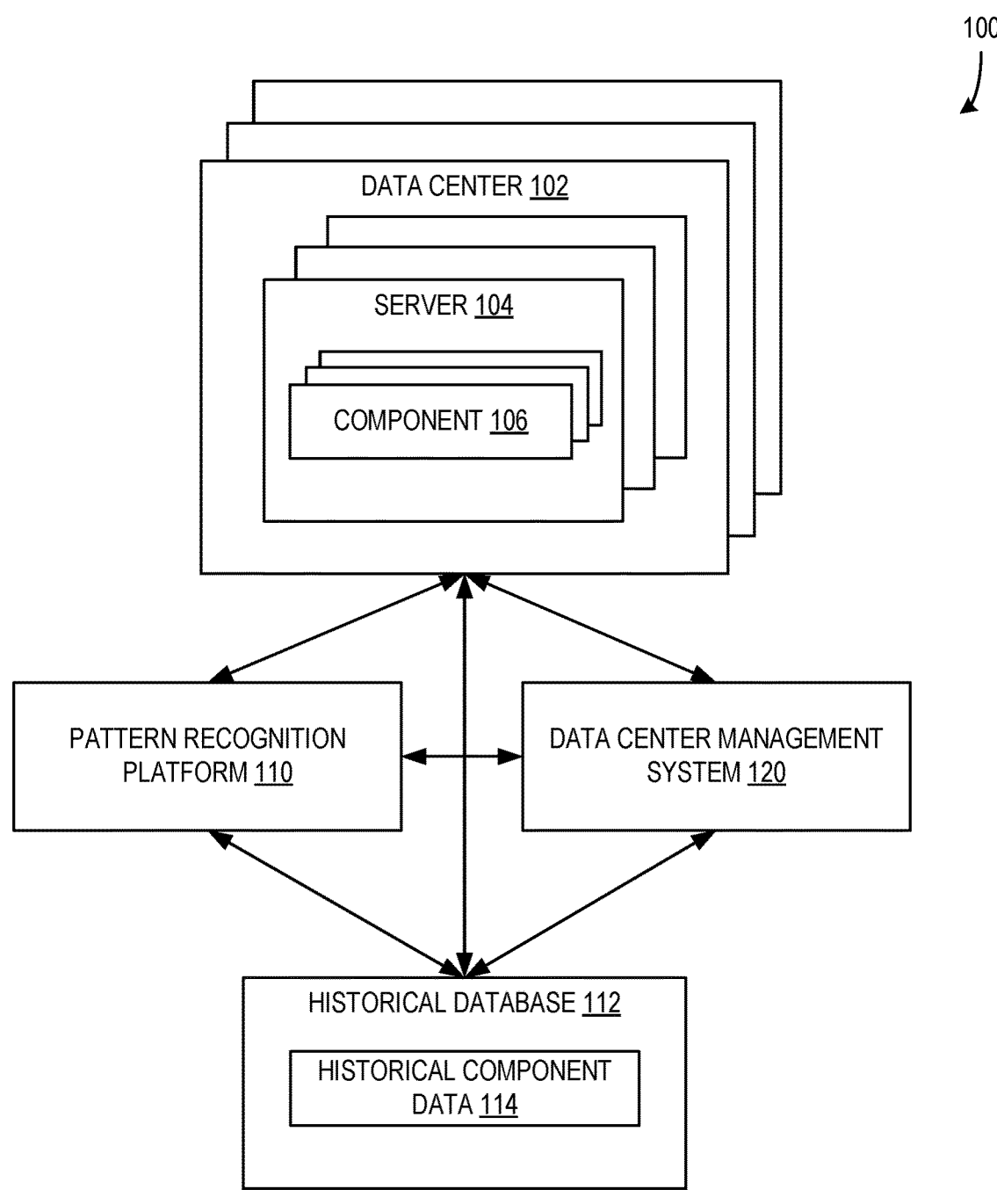
FIG. 1 is a block diagram illustrating an example system.

Data centers provide computer implemented services, such as cloud computing services. The reliability, performance, and capacity of the cloud computing services is dependent on the normal operation of the infrastructure of the data centers and a healthy status of computing components within compute nodes (e.g., the servers) in the data centers. Aspects of the disclosure perform failure prediction for the computing components, such as a Dual In-Line Memory Module (DIMM) or Dynamic Random Access Memory (DRAM), based on a pattern of features, associated with the computing component, that increase a probability or likelihood of failure.

For example, components within a server may fail based on poor quality. However, an anomaly-type failure of a component may also occur. Anomaly-type failures are not based on poor quality of the component. These types of failures are not only difficult to identify, but also difficult to predict. The examples described herein provide systems and methods that utilize historical component data (e.g., data that includes historical error information for components) along with features associated with the components (e.g., hardware SKU, running software, services provided, and the like) for a plurality of components to identify one or more patterns of these features that increase a probability that the component incurs an error (e.g., an uncorrectable error). The historical component data and features associated with each of the components, features of the servers the components are implemented on, and features of the services provided by the servers, are all used as input into a machine learning platform to identify a particular component that has an increased probability of failure-prior to actual failure of the particular component. That is, the particular component includes or is associated with a pattern of features that increases a probability of the particular component to incur an uncorrectable error. Once the particular component and the pattern of features have been identified, proactive actions may be taken that reduce the probability of an uncorrectable error. For example, mitigating actions are presented and/or implemented that decrease the impact of a probable error to minimize or eliminate any disruption in the cloud computing services.

The disclosure operates in an unconventional manner at least by utilizing historical component data to provide early quality-related faulty DIMM detection as well as identify one or more patterns of features that increase a probability that a component incurs an error and/or fails. Using counterfactual analysis or other causal inference, a particular feature is identified from the pattern of features that, if changed, decreases the probability of the particular component to incur the error. Once the system identifies the particular feature that needs to be adjusted or otherwise changed, the system provides options with respect to which adjustments and/or changes can be made. As such, proactive actions can be taken to change the particular feature to reduce the probability of the error and/or a negative impact a failed component would have on a server, a datacenter, or other aspect of the cloud computing services offered thereon.

The system addresses an inherently technical problem of accurately and efficiently predicting component failure as a result of the component being of poor quality as well as due to a particular pattern of features associated therewith, and provides a technical solution at least by pro-actively taking action to either reduce or eliminate a probability of a failure. As such, the systems described herein enable computing components to be less likely to fail, to have an extended life expectancy, to have an improved infrastructure, to be less costly to operate, and to provide improved (e.g., uninterrupted) services to users.

Referring to FIG. 1, a block diagram illustrates an example system 100 configured for failure prediction of components 106, within data centers 102, based on one or more patterns of features associated with the components 106 to accurately and efficiently improve reliability of the data centers 102. The system 100 includes a plurality of data centers 102, with each of the plurality of data centers 102 comprising a plurality of servers 104, and each of the servers 104 comprising the components 106, such as a DIMM. In another example, the system 100 includes a single data center that includes a plurality of the servers 104 and the components 106.

The historical database 112 includes historical component data 114, which comprises historical error information for each of the plurality of components 106 in the data centers 102. In one example, the historical component data 114 comprises data that represents a health status and historical errors (e.g., uncorrectable errors), if any, incurred by the components 106. In one example, the components 106 are memory components and the historical errors comprises types, frequencies, and severities of memory error signals for the components 106. In some embodiments, information in the historical database 112 comes from a variety of sources such as monitoring tools that track the health and operation at the system 100 level, at the data center 102 level, at the server 104 level, and/or at the component 106 level. For example, information may be sent from a data center management system 120 that manages and monitors the health of the data centers 102 or information may come directly from a signal emitted by the components 106. In this way, the system 100 maintains current data of the cloud computing environment.

System 100 further includes a pattern recognition platform 110 (which may be associated with, for example, offline or online learning) that accesses the historical database 112. The pattern recognition platform 110 includes a machine learning model that uses data, such as the historical component state data 114, to generate a trained pattern failure predictor that predicts at least one pattern of features associated with the components 106 that has an increased probability of causing a particular component to fail. In one example, an increased probability of failure is a threshold set by a user, administrator, or by the pattern recognition platform. For example, the increased probability of failure may be relative to the quality of the component itself, a quality of other components, or with respect to alternative configurations of features for the component, as described in further detail with respect to FIGS. 2 and 3.

Although a single the data center management system 120 is shown in FIG. 1, any number of such devices may be included. Moreover, various devices described herein might be combined according to embodiments of the present disclosure. For example, in some embodiments, the pattern recognition platform 110 and the data center management system 120 comprise a single apparatus. The pattern recognition platform 110 and/or the data center management system 120 functions may be performed by a constellation of networked apparatuses in a distributed processing or cloud-based architecture.

As used herein, devices and components, including those associated with the system 100 and any other device or component described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

A user may access the system 100 via remote monitoring devices (e.g., a personal computer ("PC"), tablet, smartphone, or remotely through a remote gateway connection to view information about and/or manage data center operation in accordance with any of the embodiments described herein. In some cases, an interactive graphical display interface may let a user define and/or adjust certain parameters (e.g., virtual machine assignments, thresholds, parameters etc.) and/or provide or receive automatically generated recommendations or results from the pattern recognition platform 110 and/or the data center management system 120.

In some examples, the pattern recognition platform 110 executes a machine learning algorithm or other artificial intelligence, such as the trained pattern failure predictor. As used herein, the phrase "machine learning" includes, but is not limited to, any approach that uses algorithms and statistical techniques that give computer systems an ability to learn (e.g., progressively improve performance of a specific task) without being explicitly programmed. Examples of machine learning may include decision tree learning, association rule learning, artificial neural networks deep learning, inductive logic programming, support vector machines ("SVM"), clustering, Bayesian networks, reinforcement learning, representation learning, similarity and metric learning, sparse dictionary learning, genetic algorithms, specific algorithms such as the apriori algorithm, rule-based machine learning, learning classifier systems, etc.

Further, the pattern recognition platform 110 receives parameters/inputs for the trained pattern failure predictor directly from a user and/or from the data center management system 120. For example, the pattern recognition platform 110 receives, from the data center management system 120, a data set (e.g., list of components, servers, data centers, and corresponding features) and corresponding information needed to execute the trained pattern failure predictor on the data set. The pattern recognition platform 110 identifies one or more patterns of features from the data set that increase a probability that a particular component within the data set incurs an error and/or fails. Using counter-factual analysis or other causal inference, the pattern recognition platform 110 identifies a particular feature from the pattern of features that, if changed, decreases the probability of the particular component to incur the error and/or fail. That is, once the pattern recognition platform 110 identifies the particular feature that needs to be changed or adjusted, the pattern recognition platform 110 or the data center management system 120 provides options with respect to which changes or adjustments can be made. As such, proactive actions may be taken to adjust or change the particular feature to reduce the probability of the error and/or negative impact a failed component would have on a server, a datacenter, and/or the cloud computing services.

Some examples are described with reference to a counter-factual analysis. A counter-factual analysis includes, for example, an analysis undertaken by a machine or a human to understand the impact of certain decisions or actions in the absence of complete actual data or experimental evidence. A counter-factual approach involves creating one or more hypothetical scenarios and comparing those to observed scenarios, to estimate causal effect. Aspects of the disclosure are not limited to counter-factual analysis, and instead are operable with other types of causal inference. For example, aspects of the disclosure are operable with randomized controlled trials, quasi-experimental designs, observational studies, propensity score matching, instrumental variables analysis, structural equation modeling, and difference-in-differences analysis.

Figure 2:
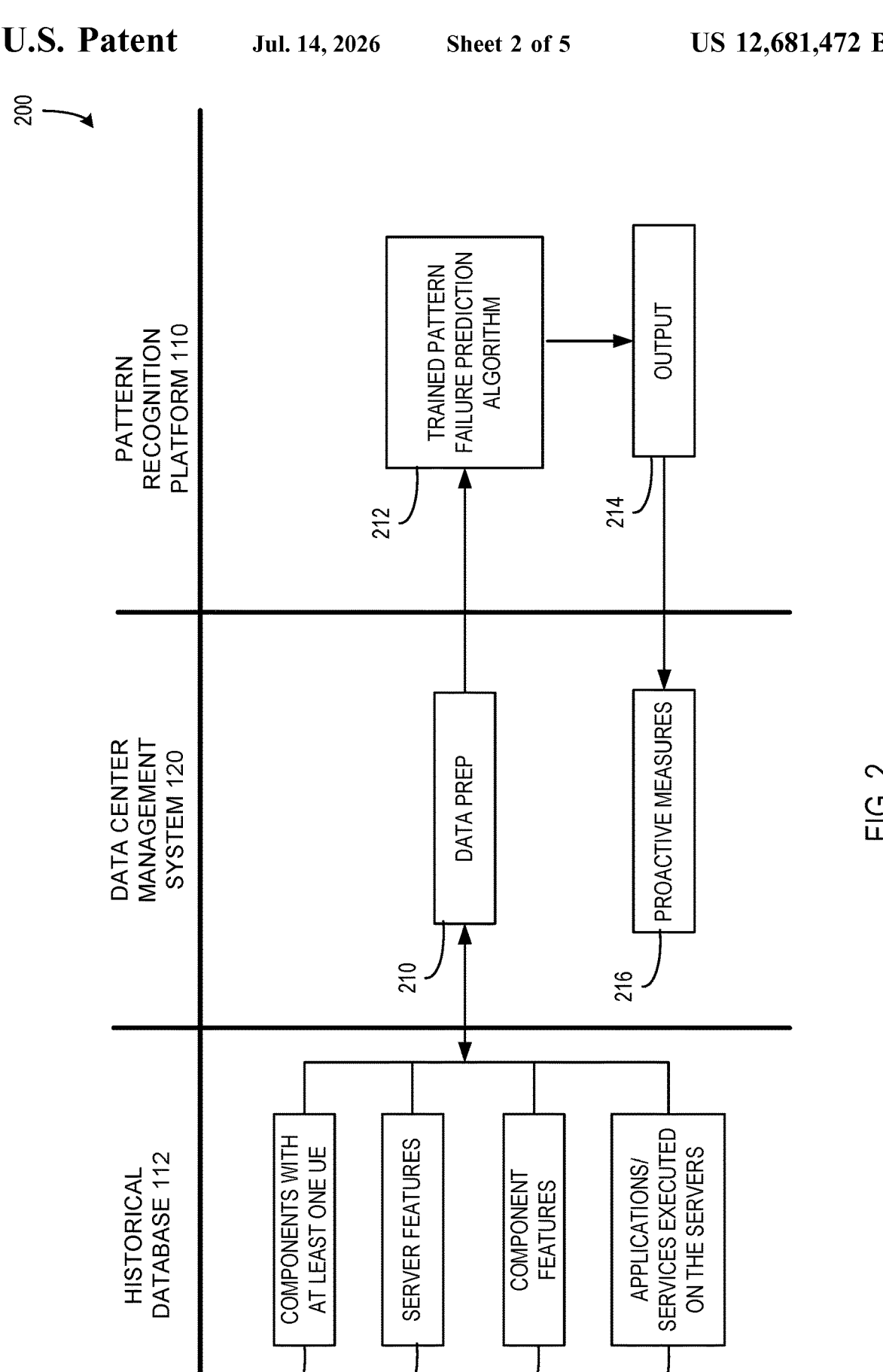
FIG. 2 is a block diagram illustrating identification of patterns of features associated with a component that increase a probability that the component incurs an error.

With reference now to FIG. 2, a diagram 200 illustrates an example process for identifying one or more patterns of features, associated with a component, that increase a probability that the component incurs an error. Prior to the pattern recognition platform 110 executing the trained pattern failure predictor, the data to be input into the trained pattern failure predictor is accessed and prepared by the data center management system 120 accessing/identifying information (e.g., 202-208) from the historical database 112.

For example, data from the historical database 112 is accessed (or received) by the data center management system 120 to perform data preparation at 210. The data center management system 120 identifies, from the historical database 112, a first set of components from the components 106 that have incurred at least one error or at least one type of error (e.g., an uncorrectable error) at 202. Based on the identification at 202, features of a first set of servers from the servers 104 associated with the first set of components are identified from the historical database 112 at 204, features of the first set of components are identified from the historical database 112 at 206, and features of applications and/or services provided by the first set of servers and the first set of components are identified from the historical database 112 at 208.

In some examples, the features of the first set of servers include one or more of the following: Server Identifier (ID), Original Equipment Manufacturer Hardware Generation, Hardware Generation, Hardware Stock Keeping Unit (SKU) ID, Has Graphical Processing Unit, Is M Series, Has Overlake Card, Processor Manufacturer, Processor Code Name, Processor Clock Speed, Number of Components (e.g., number of DIMMs, and Hosted VMs in the last x days), etc. In some examples, the first set of components are DIMMs and the features of the first set of components include one or more of the following: Serial Number, Memory Manufacturer, Memory Part Number, Memory DIMM Size in Gigabytes, Memory Speed, and Memory Is LR DIMM. In some examples, the features of the applications executed on or provided by the first set of components and/or the first set of servers include one or more of the following: Cloud Type, Advanced RISC Machines Region Name, Data Center ID, Cluster ID, Cluster Type, Operating System Version, and Firmware Version.

At 210, the data center management system 120 provides data preparation on data identified from 202-208. The data preparation ensures that results are not affected by bias. In some examples, the data preparation includes assuring that each component (or server associated therewith) has been stable for a duration of a particular observation period. For example, a component and/or server that has undergone software change during the period of observation could bias results as change could affect a probability of failure. As such, any component/server that has not been stable during the period of observation is excluded from consideration. In some examples, the components/servers that were excluded are eligible for consideration in a next period of observation assuming they are stable during the next period of observation. In some examples, the data preparation also includes filtering out components in the first set of components that are considered "repeat offenders" to ensure that these repeat offenders do not bias the results. In some examples, to identify patterns with elevated probability of failure, only newer failures are considered for pattern mining. In some examples, a repeat offender is a component that incurs a number of errors greater than a threshold number of errors during a defined period of time. In some examples, a user sets the parameters with respect to the number of errors the threshold represents, as well as the period of time in which the threshold number of errors is applied. Thus, by filtering components out of the first set of components that exceed the threshold number of errors during the defined period of time, the data for the first set of components input into the trained pattern failure predictor is normalized as outliers have been excluded. In some examples, components/servers that incur failure but are not serviced have potential to continue to produce failures. These failing components/servers can accumulate and cause use of an elevated baseline failure rate, which could invalidate true patterns of interest. In some examples, to resolve this issue, the data preparation uses data that precedes the observation period to identify repeat offenders and exclude them.

In some examples, a severity of the error is also considered during the filtering process. That is, the parameters set for the filter process not only include a threshold number of errors as a parameter, but also a severity threshold. Thus, a combination of error frequency and error severity is used to determine whether or not particular components from the first set of components should be removed from the first set of components.

In some examples, a user provides additional parameters (e.g., via a user interface) to the data center management system 120 for the data preparation at 210. That is, in some examples, the user filters the components in the first set of components based on the server the component is implemented on. For example, the user limits the type of server being considered by indicating, to the data center management system 120, a request to filter out a particular generation of servers, a particular server, servers that have not been upgraded with particular software within a latest defined period of time (e.g., the last 28 days), and/or servers that host a certain number of virtual machine (VMs) or that have hosted any VM in another defined period of time (e.g., the last 24 hours).

In another example, the user filters the components in the first set of components based on features of the components themselves. For example, the user limits the type of component being considered in the first set of components by indicating, to the data center management system 120, a request to filter out duplicate components (e.g., by serial number) and removing repeat offenders. In addition, the user includes, in some examples, the parameters that define what a repeat offender includes (e.g., defining the threshold number of errors, the severity threshold, and the like).

At 212, the pattern recognition platform 110 receives a request from the data center management system 120 to execute the trained pattern failure predictor based on the output of data from the data preparation 210. In some examples, the request is a standing request to be executed every defined period of time (e.g., every week, every day, or every hour). In this example, the data center management system 120 provides the pattern recognition platform 110 updated data prior to the pattern recognition platform 110 executing the trained pattern failure predictor. In another example, the request from the data center management system 120 for the pattern recognition platform 110 to execute the trained pattern failure predictor is a standalone request.

At 212, for each component in the filtered first set of components from the data preparation 210, the trained pattern failure predictor extracts features associated with the component, such as the features identified in 202-208. The trained pattern failure predictor contributes to better identify maximal frequent items sets without enumerating their subsets, performing jumps in a search space rather than a purely bottom-up approach, thus dramatically reducing navigation through a search space as well as speeding up a computing process. In some examples, the trained pattern failure predictor is a variation of an association rule learning algorithm, such as the apriori algorithm, which uses a breadth-first search approach optimized for a MapReduce framework, extended by a set of additional search criteria such as: simple interaction filtering, two-way interaction strength test, minimum pattern metric mean, and/or minimum pattern support. In one example, the trained pattern failure predictor compares the features associated with the component with features associated with each of the other components in the filtered first set of components. In an example, a matrix is created and used for comparing the features associated with the components in the filtered first set of components. As such, a resulting matrix can be extremely large, comprising thousands of rows and thousands of columns to cover each configuration and dimensions of the hardware, software, and services provided.

Based on the comparing, the trained pattern failure predictor identifies a particular component from the filtered first set of components that includes a pattern of features associated therewith that indicates the component has failed or that indicates an increased probability of the particular component to incur another error. At this point, the trained pattern failure predictor has identified a particular component has either failed or has an increased probability of another uncorrectable error: however, it has not yet been identified by the trained pattern failure predicter as to whether the particular component is of poor quality (e.g., it is the component itself that has failed or that will likely cause the failure) or, if it is not the component itself, then which feature from the pattern of features may be adjusted or changed to reduce the probability of the particular component incurring the error. In some examples, the information from the historical database 120 identifies signals that detect the component has failed or is likely to fail based on poor quality, and these signals may indicate one or more of the following: a decreased performance, frequent errors, unexpected behaviors, error messages, an increased number of read/write errors, and/or unresponsiveness. For example, within the historical database 120 is a collection of DIMM telemetry logs that are analyzed by the trained pattern failure predictor to distinguish DIMM quality-related failures from all other DIMM failures.

In some examples, the trained pattern failure predictor uses counter-factual analysis to identify a particular feature from the pattern of features that, if changed, decreases the probability of the particular component to incur another uncorrectable error. For example, the trained pattern failure predictor may identify that for a particular component (e.g., DIMM) having a particular feature (e.g., a speed of 2900 MHZ) implemented on a particular server, that a change in the speed of the DIMM affects the probability of a failure for the DIMM. That is, the trained pattern failure predictor may predict that the DIMM at 2600 Mhz has greater than 0.2% chance of error, the DIMM at 2900 Mhz has greater than 1.5% chance of error, and the DIMM at 3200 Mhz has greater than 0.3% chance of error. In an example, the trained pattern failure predictor produces these findings at 214 as output to the data center management system 120. The data center management system 120 takes proactive measures based on the received output at 216.

For example, when the received output 216 indicates that the particular component is likely to fail based on poor quality (e.g., quality defects related to a manufacturing process or wrong product design), these types of faulty components should be replaced, as soon as possible. In some examples, in addition to replacing the components identified, the pattern recognition platform 110 extends the investigation to same lot numbers, date codes, or even same process related products to further identify which other components are likely to fail as well as identifying a likely source of the failure. For example, if the particular component is likely to fail based on a quality issue, this failure is escalated to stop use of related lots/date code/process of other related components, with notifications to a vendor/manufacturer to quickly have risk assessment/isolation/mitigation actions to minimize an impact of services provided by the corresponding servers/data centers.

In another example, based on the determination that a probability of the DIMM failing with a speed of 2600 Mhz, 2900 Mhz, and 3200 Mhz is greater than 0.2%, 1.5%, and 0.3%, respectively, a user determines to change, through the data center management system 120, the current speed of the DIMM from 2900 Mhz to 2600 Mhz. While changing the speed of the DIMM is provided herein as an example of a proactive measure, other proactive measures may include updating the basic input/output system (BIOS) and updating the hardware (e.g., replace the DIMM). Alternatively or in addition, the change in speed of the DIMM may be decided upon and implemented automatically, without user input or otherwise. For example, the data center management system 120 analyzes the DIMM speed and failure rates, selects the speed with the lowest rate, and adjusts the DIMM speed to the selected speed, all without involving a physical user in the decision and/or implementation.

In an example involving a user, the output from 214 is presented by the data center management system 120 to a user via a user interface to enable the user to make a decision on how to proceed with the changes/adjustments, if at all. In another example, the output from 214 includes other features that have been identified that, if changed, decreases the probability of the particular component to incur another uncorrectable error. In this example, the user has the option to not only select which of the identified features to adjust/change, but also select how to change the feature at 216.

In some examples, preventative and mitigating measures are taken in lieu of, or in addition to the proactive measures taken at 216. In some examples, preventative measures include replacing the particular component, limiting use of the particular component (e.g., DRAM or DIMM) from a particular manufacturer or avoid mixing components from multiple vendors. In some examples, mitigating measures include live migration of VMs. For example, while knowing that a component has an increased probability of failing enables the data center management system 120 to take and/or present proactive actions to prevent a negative impact a failed component would have on a server, a datacenter, and/or the cloud computing services, the data center management system 120 also provides the ability to track which VMs would be impacted by a future failure of a particular component. That is, in some examples, the data center management system 120 assigns VMs to be executed on a particular one of the servers 104 and/or monitors which VMs are assigned to the particular ones of the servers 104 and/or components 106. As such, when a live migration is implemented as a result of a mitigating action being executed in light of a predicted failure of one of the components 106, the data center management system 120 has knowledge of which of the components 106, on which of the servers 104, in which of the data centers 102, are healthy and have a capacity for the VMs being migrated. As such, the trained pattern failure predictor executed by the pattern recognition platform 110 may be used to intelligently allocate VMs on healthy ones of the components 106 and/or the servers 104. This enables the cloud computing services provided by the data centers 102 to not be disrupted, and the VMs are less likely to suffer future failures.

Figure 3:
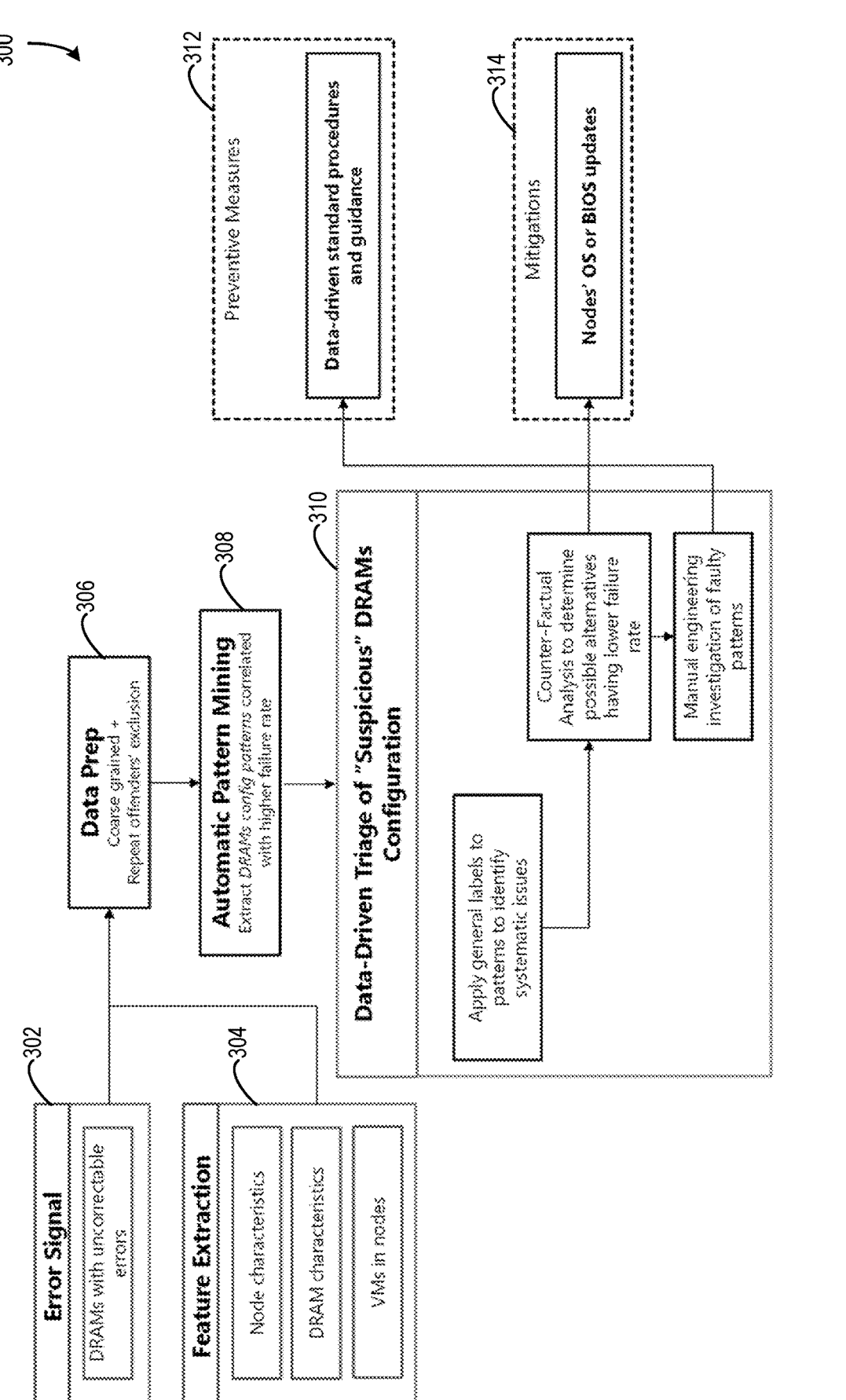
FIG. 3 is a block diagram illustrating an example architecture for implementing an example method of identifying patterns and predicting component failures.

Referring next to FIG. 3, a block diagram illustrates an example architecture 300 for implementing an example method of identifying patterns and predicting component failures.

For example, data from the historical database 112 is accessed (or received) by the data center management system 120 to perform data preparation at 306. The data center management system 120 identifies, from the historical database 112, error signals at 302 from particular components from the components 106 that have incurred at least one error or at least one type of error (e.g., an uncorrectable error). Based on the identification at 302, at 304, features associated with particular nodes (e.g., servers 104) associated with the particular components identified from the historical database 112 at 304, features of the particular components identified from the historical database 112 at 304, and features of applications and/or services provided by the particular nodes and the particular components are identified from the historical database 112. The historical database 112 includes information such as telemetry logs for each of the components 106. This information is used to understand healthy statistics for the components 106 as well as early detection of a component failing. As described in further detail below, this information (e.g., telemetry logs) is also analyzed to distinguish quality-related failures from other anomaly-type failures.

The data center management system 120 provides data preparation at 306 based on the data/information identified at 302 and 304. In some examples, the data preparation includes filtering out components in the first set of components that are considered "repeat offenders". In some examples, a repeat offender is a component that incurs a number of errors greater than a threshold number of errors during a defined period of time. In some examples, a combination of error frequency and error severity is used to determine whether or not particular components from the first set of components should be removed from the first set of components.

At 308, the pattern recognition platform 110 provides automatic pattern mining on the data/information received from the data preparation at 306. In some examples, the pattern recognition platform 110 extracts component configurations (e.g., DRAM configurations) and correlates these configurations with failure rates and more specifically, higher failure rates. Based on the comparing, the pattern recognition platform 110 applies general labels to identify systemic issues. For example, the pattern recognition platform identifies a particular component from a filtered set of components that includes a pattern of features associated therewith that increases a probability of the particular component to incur another error. In some examples, the trained pattern failure predictor uses counter-factual analysis to determine possible alternatives for achieving a lower failure rate. For example, the pattern recognition platform 110 identifies a particular feature from the pattern of features that, if changed, decreases the probability of the particular component to incur another uncorrectable error. For example, the pattern recognition platform 110 identifies that for a particular component (e.g., DIMM) having a particular feature (e.g., a speed of 2900 MHZ) implemented on a particular server, that a change in the speed of the DIMM affects the probability of a failure for the DIMM. In some examples, after identifying the possible alternatives, an investigation (e.g., manual engineering investigation) is initiated to further look into the identified pattern of features that increased the likelihood of the particular component failing.

At 312, preventative measures are taken based on the counter-factual analysis performed at 310. For example, based on data-driven standard procedures and guidance, the particular features or combination of particular features that increased the likelihood of the particular component to fail can be replaced, have reduced usage (or reduce further implementations) and/or avoid mixing certain features or certain components in future configurations. In addition to preventative measures at 312, mitigating measures are also taken at 314. In some examples, where the feature that caused the increase likelihood of failure is the operating system or BIOS, these features are updated to reduce the likelihood of a failure to occur. The preventative measures and/or mitigations may be performed by a human, or automatically by software, hardware, and/or firmware.

FIG. 4 is a flowchart illustrating an exemplary method 400 for identifying one or more patterns of features associated with a component from the components 106 that increases a probability that the component incurs an error. In some examples, the method 400 is executed or otherwise performed by or in association with a system such as system 100 of FIG. 1.

At 402, a first set of components from the components 106 that have incurred an uncorrectable error, and a second set of components from the components 106 that have not incurred an uncorrectable error, are identified from the historical component data 114. In some examples, the components 106 are DIMM and/or DRAM type memories. In some examples, components from the first set of components are filtered out of the first set of components prior to executing the trained pattern failure predictor. For example, some components in the first set of components may be identified as repeat offenders. By removing components (e.g., repeat offenders), from the first set of components, that exceed the threshold number of errors during the defined period of time, the data for the first set of components input into the trained pattern failure predictor is normalized as outliers have been excluded. In some examples, other factors may also be considered when filtering additional components from the first set of components. Examples of other factors include a severity of the error and additional parameters corresponding the particular component and/or the server the particular component is implemented on. For example, a user limits the type of component being considered or a type of server the component is implemented on.

At 404, for each component in the first set of components, features associated with the component are extracted. The features associated with the component include features of the component, features of a compute node in which the component is executed on, and features of services provided by the compute node. In some examples, the features include signal data from telemetry logs, which are used to identify the health/quality of a component, as well as provide early detection of a failed component.

At 406, for each component in the first set of components, the features associated with the component are compared with features associated with each of the other components in the first set of components. At 408, based on the comparing, a particular component comprising a pattern of features associated therewith is identified that increases a probability of the particular component to incur another uncorrectable error. In another example, based on the comparing, it is detected that a particular component comprising a pattern of features associated therewith has already incurred another uncorrectable error and/or has failed. In some examples, the pattern of features is one or more signals from the telemetry logs that indicate the particular component has already failed and is of poor quality. At 410, a particular feature from the pattern of features is identified that, if changed, decreases the probability of the particular component to incur an uncorrectable error. In some examples, the particular feature is the component itself that should be replaced. In other examples, the particular feature is running software, services provided, or another component the particular component interacts with. At 412, based on the identifying, alternatives for the particular feature are provided such that, when one of the alternatives is implemented, the probability of the particular component to incur an uncorrectable error is decreased. In some examples, the alternatives for the particular feature comprise one or more of the following: the particular feature with different specifications, the particular feature with different firmware, the particular feature with different part numbers, and the particular feature with a different manufacture.

In another example, based on identifying at 412, mitigating actions for the particular feature are provided such that, when one of the mitigating actions is implemented, an impact of a failed component is reduced. In some examples, the mitigating action comprises migrating VMs from a compute node implementing the particular component to another compute node.

Exemplary Operating Environment

Figure 5:
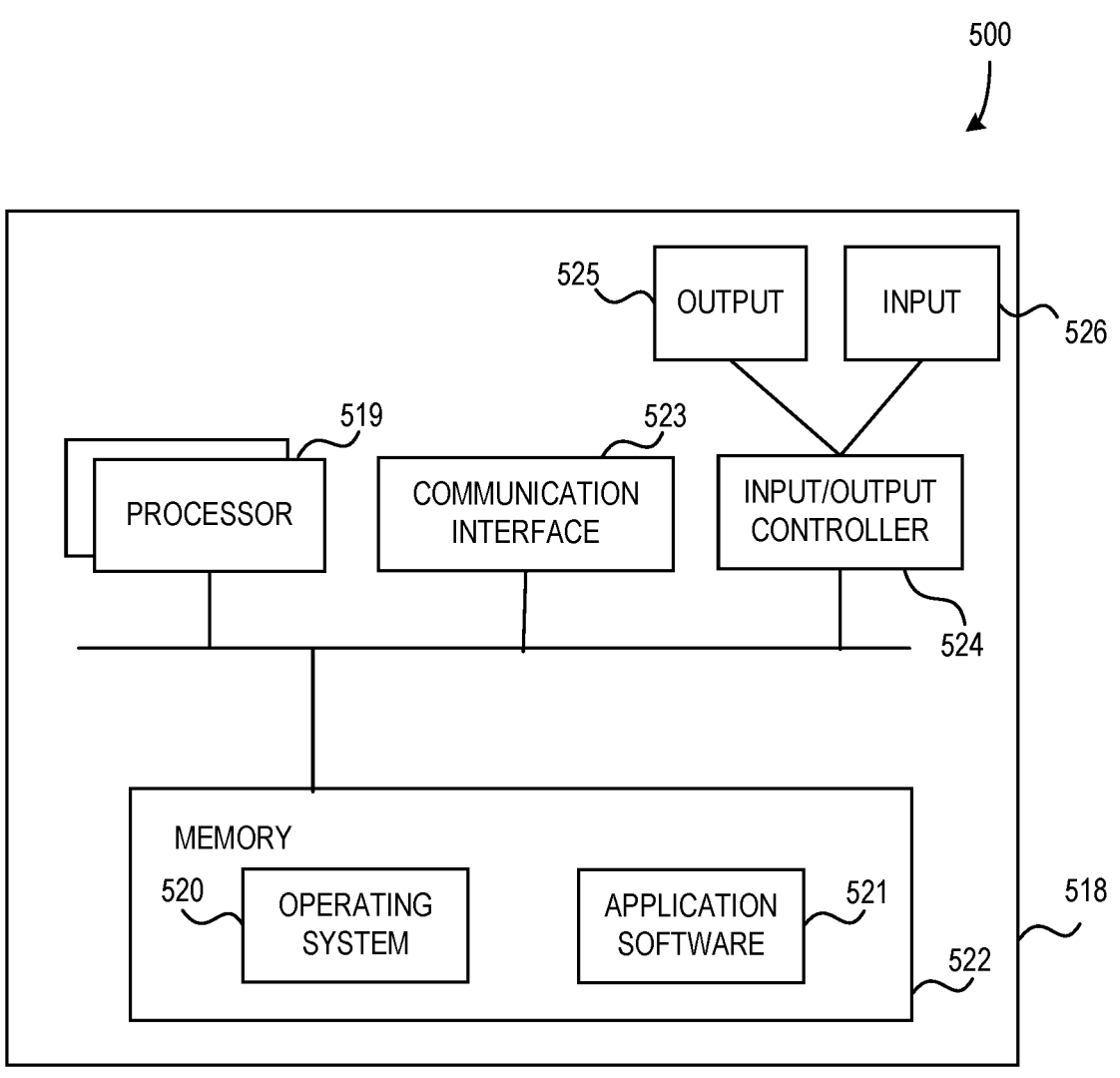
FIG. 5 illustrates an example computing apparatus as a functional block diagram.

The present disclosure is operable with a computing apparatus according to an embodiment as a functional block diagram 500 in FIG. 5. In an example, components of a computing apparatus 518 are implemented as a part of an electronic device (e.g., an electronic device that either includes or is connected to the data center management system 120) according to one or more embodiments described in this specification. The computing apparatus 518 comprises one or more processors 519 which may be microprocessors, controllers, or any other suitable type of processors for processing computer executable instructions to control the operation of the electronic device. Alternatively, or in addition, the processor 519 is any technology capable of executing logic or instructions, such as a hardcoded machine. In some examples, platform software comprising an operating system 520 or any other suitable platform software is provided on the apparatus 518 to enable application software 521 to be executed on the device.

In some examples, computer executable instructions are provided using any computer-readable media that is accessible by the computing apparatus 518. Computer-readable media include, for example, computer storage media such as a memory 522 and communications media. Computer storage media, such as a memory 522, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium is not, and does not include, a propagating signal. Propagated signals are not examples of computer storage media. Although the computer storage medium (the memory 522) is shown within the computing apparatus 518, it will be appreciated by a person skilled in the art, that, in some examples, the storage is distributed or located remotely and accessed via a network or other communication link (e.g., using a communication interface 523).

Further, in some examples, the computing apparatus 518 comprises an input/output controller 524 configured to output information to one or more output devices 525, for example a display or a speaker, which are separate from or integral to the electronic device. Additionally, or alternatively, the input/output controller 524 is configured to receive and process an input from one or more input devices 526, for example, a keyboard, a microphone, or a touchpad. In one example, the output device 525 also acts as the input device. An example of such a device is a touch sensitive display. The input/output controller 524 may also output data to devices other than the output device, e.g., a locally connected printing device. In some examples, a user provides input to the input device(s) 526 and/or receives output from the output device(s) 525.

The functionality described herein can be performed, at least in part, by one or more hardware logic components.

According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: a processor; a historical database comprising historical component data for a plurality of components, the historical component data comprising historical error information for each of the plurality of components; and a computer storage medium comprising computer-executing instructions that, when executed by the processor, cause the processor to perform the following operations: identifying, from the historical component data, a first set of components from the plurality of components that have incurred an uncorrectable error and a second set of components from the plurality of components that have not incurred an uncorrectable error: for each component in the first set of components: extracting features associated with the component, the features associated with the component comprising: features of the component, features of a compute node in which the component is executed on, and features of services provided by the compute node; and comparing the features associated with the component with features associated with each of the other components in the first set of components: based on the comparing, identifying a particular component comprising a pattern of features associated therewith that increases a probability of the particular component to incur another uncorrectable error: identifying a particular feature from the pattern of features that, if changed, decreases the probability of the particular component to incur another uncorrectable error: based on the identifying, providing alternatives for the particular feature such that, when one of the alternatives is implemented, the probability of the particular component to incur another uncorrectable error is decreased.

An example computerized method comprises: identifying, from historical component data, a first set of components from a plurality of components that have incurred an uncorrectable error and a second set of components from the plurality of components that have not incurred an uncorrectable error: for each component in the first set of components: extracting features associated with the component, the features associated with the component comprising: features of the component, features of a compute node in which the component is executed on, and features of services provided by the compute node; and comparing the features associated with the component with features associated with each of the other components in the first set of components: based on the comparing, identifying a particular component comprising a pattern of features associated therewith that increases a probability of the particular component to incur another uncorrectable error: identifying a particular feature from the pattern of features that, if changed, decreases the probability of the particular component to incur another uncorrectable error: based on the identifying, providing alternatives for the particular feature such that, when one of the alternatives is implemented, the probability of the particular component to incur another uncorrectable error is decreased.

One or more computer storage media have computer-executable instructions that, upon execution by a processor, cause the processor to perform the following: identifying, from historical component data, a first set of components from a plurality of components that have incurred an uncorrectable error and a second set of components from the plurality of components that have not incurred an uncorrectable error: for each component in the first set of components: extracting features associated with the component, the features associated with the component comprising: features of the component, features of a compute node in which the component is executed on, and features of services provided by the compute node; and comparing the features associated with the component with features associated with each of the other components in the first set of components: based on the comparing, identifying a particular component comprising a pattern of features associated therewith that increases a probability of the particular component to incur another uncorrectable error: identifying a particular feature from the pattern of features that, if changed, decreases the probability of the particular component to incur another uncorrectable error: based on the identifying, providing alternatives for the particular feature such that, when one of the alternatives is implemented, the probability of the particular component to incur another uncorrectable error is decreased.

Alternatively, or in addition to the other examples described herein, examples include any combination of the following:

wherein the computer storage medium comprises further executable instructions that, when executed by the processor, further cause the processor to perform the following operations: filtering out components in the first set of components that have incurred a number of errors greater than a threshold number of errors during a defined period of time.

wherein filtering out components in the first set of components further comprises filtering out components in the first set of components that have incurred an error having a severity level greater than a threshold severity level.

wherein the component is a Dual In-Line Memory Module (DIMM) or Dynamic Random Access Memory (DRAM).

further comprising a pattern recognition platform coupled to the historical database, the pattern recognition platform generating a machine learning trained pattern failure predictor that provides the computer-executable instructions.

wherein the alternatives for the particular feature comprises one or more of the following: the particular feature with different specifications, the particular feature with different firmware, the particular feature with different part numbers, and the particular feature with a different manufacture.

wherein the computer storage medium comprises further executable instructions that, when executed by the processor, further cause the processor to perform the following operations: using counter-factual analysis to identify the particular feature from the pattern of features that, if changed, decreases the probability of the particular component to incur another uncorrectable error.

further comprising based on the identifying, providing mitigating actions for the particular feature such that, when one of the mitigating actions is implemented, an impact of a failed component is reduced.

wherein the mitigating action comprises migrating virtual machines from a compute node implementing the particular component to another compute node.

wherein extracting features associated with the component further comprises extracting signal data from telemetry logs; and determining, based at least on the extracted signal data, that the particular component has an increased probability of failing based at least on a quality of the particular component.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures are implemented as software instructions encoded on a computer storage medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

As used herein, the term "set" is non-empty, and may also be referred to as a "group".

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor;
a historical database comprising historical error information for a plurality of components; and
a computer storage medium comprising computer-executable instructions that, upon execution by the processor, cause the processor to perform the following operations:

identifying, from the historical error information, that a first component of the plurality of components has incurred an uncorrectable error;

extracting a first feature associated with the first component, the first feature associated with the first component comprising:

a feature of the first component, a feature of a compute node upon which the first component is executed, or a feature of a service provided by the compute node;

comparing the first feature associated with the first component with a second feature associated with a second component of the plurality of components;

based on the comparing, identifying a third component of the plurality of components comprising a pattern of features that increases a probability of the third component to incur the uncorrectable error;

identifying a feature of the third component from the pattern of features that, responsive to being changed, decreases the probability of the third component to incur the uncorrectable error; and based on identifying the feature of the third component that responsive to being changed decreases the probability of the third component to incur the uncorrectable error, implementing a mitigating action for the identified feature of the third component comprising migrating a virtual machine from a compute node implementing the third component to another compute node.

2. The system of claim 1, wherein the computer storage medium comprises further executable instructions that, on being executed by the processor, further cause the processor to perform the following operations:

filtering out a fourth component in the plurality of components that has incurred a number of errors greater than a threshold number of errors during a period of time.

3. The system of claim 1, wherein the computer storage medium comprises further executable instructions that, on being executed by the processor, further cause the processor to perform the following operations:

filtering out a fourth component in the plurality of components that has incurred an error having a severity level greater than a threshold severity level.

4. The system of claim 1, wherein the third component is a Dual In-Line Memory Module (DIMM) or a Dynamic Random Access Memory (DRAM).

5. The system of claim 1, further comprising a pattern recognition platform coupled to the historical database, the pattern recognition platform generating a pattern failure predictor that provides the computer-executable instructions, the pattern failure predictor trained in part using machine learning.

6. The system of claim 1, wherein identifying the feature from the pattern of features that, responsive to being changed, decreases the probability of the third component to incur the uncorrectable error further comprises using a causal inference.

7. The system of claim 1, wherein the computer storage medium comprises further executable instructions that, upon being executed by the processor, further cause the processor to perform the following operations:

extracting the first feature associated with the first component further comprising extracting signal data from a telemetry log; and detecting, based at least on the extracted signal data and a quality of the first component, that the third component has failed or is likely to fail.

8. A computerized method comprising:

identifying, from historical error information, that a first component of a plurality of components has incurred an uncorrectable error;

extracting a first feature associated with the first component, the first feature associated with the first component comprising:

a feature of the first component, a feature of a compute node upon which the first component is executed, or a feature of a service provided by the compute node;

comparing the first feature associated with the first component with a second feature associated with a second component of the plurality of components;

based on the comparing, identifying a third component of the plurality of components comprising a pattern of features that increases a probability of the third component to incur the uncorrectable error;

identifying a feature of the third component from the pattern of features that, responsive to being changed, decreases the probability of the third component to incur the uncorrectable error; and based on identifying the feature of the third component that responsive to being changed decreases the probability of the third component to incur the uncorrectable error, implementing a mitigating action for the identified feature of the third component comprising migrating a virtual machine from a compute node implementing the third component to another compute node.

9. The computerized method of claim 8, further comprising filtering out a fourth component in the plurality of components that has incurred a number of errors greater than a threshold number of errors during a period of time.

10. The computerized method of claim 8, further comprising filtering out a fourth component in the plurality of components that has incurred an error having a severity level greater than a threshold severity level.

11. The computerized method of claim 8, wherein the third component is a Dual In-Line Memory Module (DIMM) or a Dynamic Random Access Memory (DRAM).

12. The computerized method of claim 8, wherein the uncorrectable error is an anomaly-type error.

13. The computerized method of claim 8, wherein a machine learning platform identifies the third component comprising the pattern of features that increase the probability of the third component to incur the uncorrectable error prior to an actual failure of the third component.

14. The computerized method of claim 8, wherein identifying the feature from the pattern of features that, responsive to being changed, decreases the probability of the third component to incur the uncorrectable error further comprises using a causal inference.

15. A computer storage medium storing computer-executable instructions that, upon execution by a processor, cause the processor to perform the following:

identifying, from historical error information, that a first component of a plurality of components has incurred an uncorrectable error:

extracting a first feature associated with the first component, the first feature associated with the first component comprising:

a feature of the first component, a feature of a compute node upon which the first component is executed, or a feature of a service provided by the compute node;

comparing the first feature associated with the first component with a second feature associated with a second component of the plurality of components;

based on the comparing, identifying a third component of the plurality of components comprising a pattern of features that increases a probability of the third component to incur the uncorrectable error;

identifying a feature of the third component from the pattern of features that, responsive to being changed, decreases the probability of the third component to incur the uncorrectable error; and based on identifying the feature of the third component that responsive to being changed decreases the probability of the third component to incur the uncorrectable error, implementing a mitigating action for the identified feature of the third component comprising migrating a virtual machine from a compute node implementing the third component to another compute node.

16. The computer storage medium of claim 15, wherein the computer storage medium comprises further executable instructions that, upon execution by the processor, further cause the processor to perform the following operations:

filtering out a fourth component in the plurality of components that has incurred a number of errors greater than a threshold number of errors during a period of time.

17. The computer storage medium of claim 15, wherein the computer storage medium comprises further executable instructions that, upon execution by the processor, further cause the processor to perform the following operations:

filtering out a fourth component in the plurality of components that has incurred an error having a severity level greater than a threshold severity level.

18. The computer storage medium of claim 15, wherein identifying the feature from the pattern of features that, responsive to being changed, decreases the probability of the third component to incur the uncorrectable error further comprises using a causal inference.

19. The computer storage medium of claim 15, wherein the computer storage medium comprises further executable instructions that, upon execution by the processor, further cause the processor to perform the following operations:

using counter-factual analysis to identify the feature of the third component from the pattern of features that, if changed, decreases the probability of the third component to incur an uncorrectable error.

20. The computer storage medium of claim 15, wherein the uncorrectable error is an anomaly-type error.

*  *  *  *  *